United States Patent

[11] 3,607,283

[72] Inventor Nicholas Gold
 Arlington, Mass.
[21] Appl. No. 784,160
[22] Filed Dec. 16, 1968
[45] Patented Sept. 21, 1971
[73] Assignee Polaroid Corporation
 Cambridge, Mass.

[54] PHOTOGRAPHIC FILM ASSEMBLAGE
 8 Claims, 3 Drawing Figs.
[52] U.S. Cl. ................................................ 96/76,
 95/19, 95/66
[51] Int. Cl. ....................................... G03b 17/26,
 G03c 3/00
[50] Field of Search ................................... 96/3, 29,
 26; 95/13, 19, 67

[56] References Cited
 UNITED STATES PATENTS
1,933,823 11/1933 Nagel ........................... 95/66

| 2,978,971 | 4/1961 | Eburn ........................... | 95/13 |
| 3,309,201 | 3/1967 | Friedman ..................... | 96/3 |
| 3,405,618 | 11/1968 | Land ............................. | 95/13 |
| 3,426,664 | 2/1969 | Norton ......................... | 95/13 |

Primary Examiner—William D. Martin
Assistant Examiner—William R. Trenor
Attorneys—Brown and Mikulka, Robert E. Corb and Alfred E. Corrigan ABSTRACT: A photographic film assemblage including a container for holding film units, having a forward wall with a light-transmitting section therein and an end wall cooperating with the forward wall to define a withdrawal opening; a plurality of film units stacked within the container with one of the film units located in alignment with the withdrawal opening; and a stop in the form of an integral extension of the end wall extending part way across the withdrawal opening to prevent the movement of more than one film unit at a time from the container through the withdrawal opening.

INVENTOR.
NICHOLAS GOLD

PATENTED SEP 21 1971    3,607,283

INVENTOR.
NICHOLAS GOLD

BY Brown and Mikulka
and
Alfred E. Corrigan
ATTORNEYS

PHOTOGRAPHIC FILM ASSEMBLAGE

The present invention is concerned with improvements in photographic film assemblages or packs of the type including a container and a plurality of photosensitive elements or film units adapted to be exposed, in sequence, within the container and withdrawn therefrom following exposure. The container is provided with an elongated opening in one end thereof dimensioned to permit the passage of the film units therethrough and a forward wall having a light-transmitting section. The film units are stacked within the container with the leading end of each film unit positioned adjacent an end wall and with a forwardmost film unit positioned with its photosensitive surface facing in the direction of the forward wall in position for exposure to light transmitted through the light-transmitting section and its leading end in alignment with said elongated opening. Support means are provided for engaging the film unit furthest from the light-transmitting section and for urging the film units toward the light-transmitting section.

It is important in film assemblages of the foregoing type, that means be provided for preventing the movement of more than one film unit at a time through the elongated opening. Accordingly, one object of the invention is to provide in a film assemblage of the type set forth above, simple, inexpensive and effective stop means for preventing the movement of more than one film unit at a time through said elongated opening while restraining the remaining film units against substantial movement.

Film assemblages of the type set forth above are usually provided with a slot in the forward wall of the container adjacent the elongated opening for receiving film advancing means for engaging and moving each film unit, subsequent to exposure, through the elongated opening. In some instances, it may be possible for the film advancing means to move a portion of a film unit to a position out of alignment with the elongated opening wherein it cannot clear the aforementioned stop means. In order to minimize this problem, the stop means should be located at a distance from the film advancing means, i.e., at a point where the degree of deflection of the film unit is at a minimum. Therefore, another object of the invention is to provide in a film assemblage of the foregoing type including a container having at one end thereof an elongated opening and a forward wall having a slot therein located adjacent one end of said elongated opening for receiving film advancing means for engaging and moving a film unit positioned within the container through said elongated opening, stop means located near the end of said elongated opening most remote from said slot for preventing movement of more than one film unit at a time through said elongated opening.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
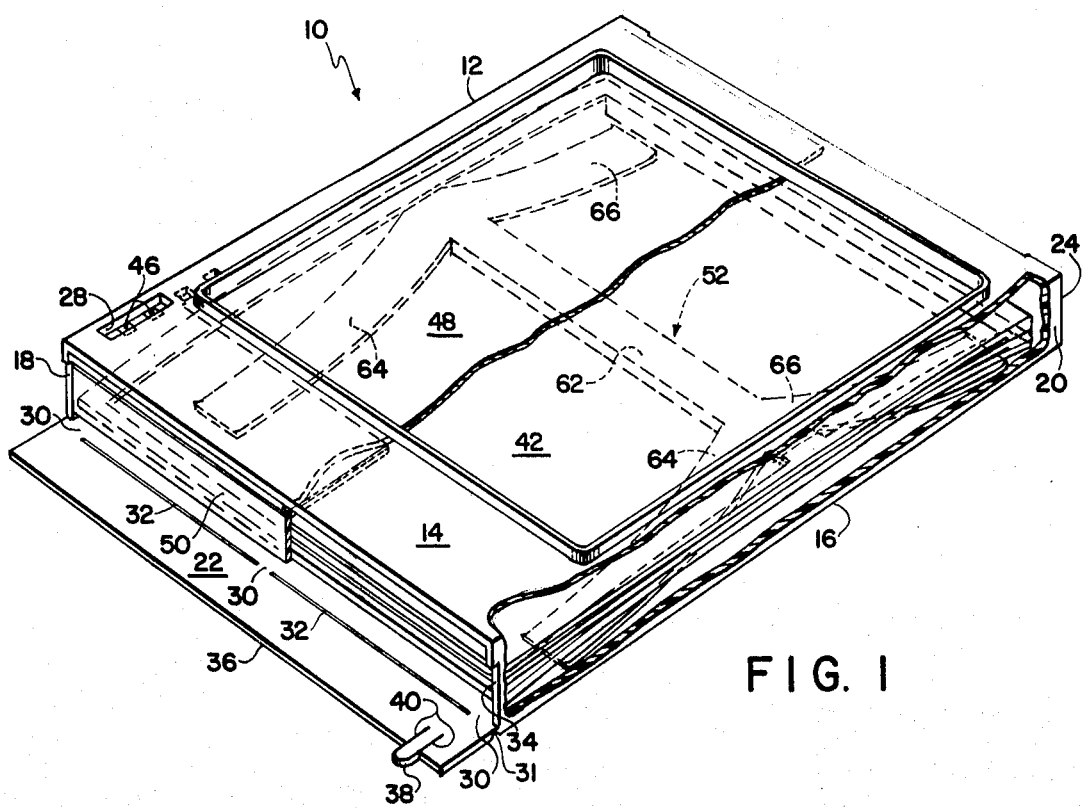
FIG. 1 is a perspective view, partly in section, of the film assemblage of the instant invention.
Figure 2:
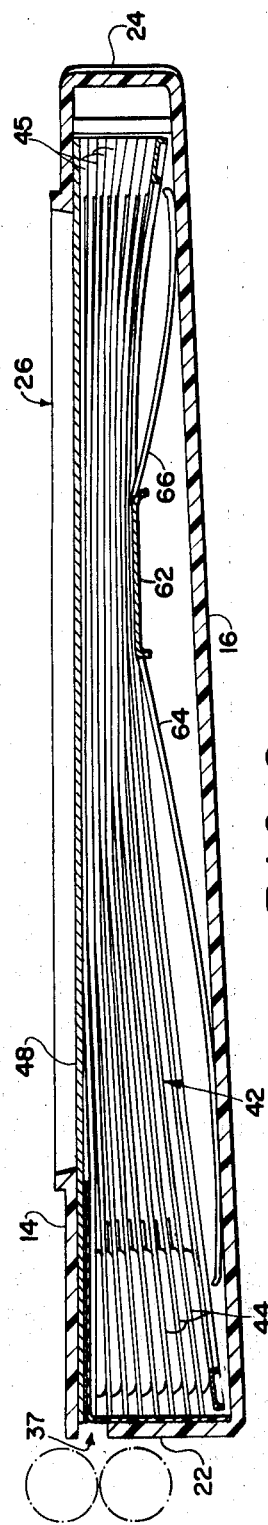
FIG. 2 is a side view, partly in section, of the film assemblage of FIG. 1 with the end wall of the container shown in its closed position.

Reference is now made to FIGS. 1 and 2 of the drawings wherein is illustrated the film assemblage or pack of the instant invention denoted generally by reference numeral 10. Film assemblage 10 includes a container 12, made from any suitable opaque material, having a forward wall 14, a rear wall 16, sidewalls 18, 20 and end walls 22, 24. Forward wall 14 has a light-transmitting section or exposure aperture 26 and an elongated slot 28 therein for receiving means for moving a film unit from the container 12. End wall 22, which is shown in FIG. 1 in a position just prior to its being folded 90° and ultrasonically welded to the ends of walls 18, 20 and sealed thereto (as shown in FIG. 2), is attached to the rear wall 16 by an integral hinge comprised of a plurality of sections 30 of a thickness 31 less than that of wall 22 interrupted by narrow elongated openings 32, said openings being sealed after the wall has been moved to the position shown in FIG. 2. It should be understood that during the molding of container 12, a thin film of plastic may close the openings 32 but for all practical purposes they may be considered as being open. In the folded position, end wall 22 fits within recessed portions 34 in the ends of sidewalls 18, 20 and edge 36 of wall 22 cooperates with an end of forward wall 14 to define a withdrawal slot 37 through which a film unit may be moved subsequent to exposure.

Figure 3:
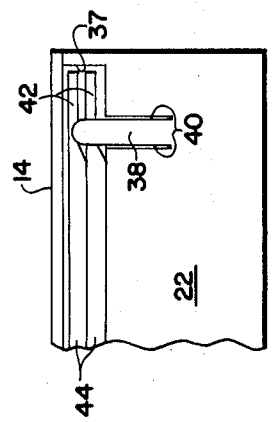
FIG. 3 is an enlarged view of one end of the elongated opening in an end wall of the container.

In order to insure that only one film unit at a time will pass through opening 37, stop means in the form of a projection or extension 38 is provided. Extension 38, which is an integral part of end wall 22, extends part way across opening 37 to a position wherein it obstructs passage of the forwardmost film unit, i.e., the film unit positioned closest to forward wall 14, as can be seen in FIG. 3. Slits 40 are provided along each side of extension 38 in order to provide it with a degree of resiliency such that when the forwardmost film unit is advanced through the opening 37, the leading edge of the film unit will engage and deflect extension 38 to a position wherein the forward film unit, only, is allowed to move through the opening 37.

Positioned within the container 12 are a plurality of film units 42, only two of which are shown in FIG. 1, of the type shown and described in detail in the U.S. patent applications of Edwin H. Land, Ser. No. 622,287 and Edwin H. Land et al., Ser. No. 622,286, now abandoned, both filed Mar. 10, 1967. Film units of this type each include all of the materials necessary to produce a positive photographic print including a photosensitive element, an image-receiving element which is transparent and is secured in face-to-face relation with the photosensitive element and a rupturable container 44 of processing liquid secured to the leading end of the photosensitive and image-receiving elements for dispensing its liquid contents therebetween in response to the application of compressive pressure to the container 44. Each film unit is adapted to be processed by advancing the film unit, container 44 foremost, between a pair of pressure-applying members, e.g., rolls, which dispense the liquid contents of the container 44 therefrom between the photosensitive and image-receiving elements and spread the liquid between and in contact with the two elements toward the trailing edge thereof. Each film unit is provided near one lateral edge thereof with a plurality of apertures (not shown), some of which are in alignment with slot 28, which are adapted to receive means (not shown) for cooperating with the apertures to move the film unit from the container 12 via the aforementioned withdrawal slot 37.

As can be seen in FIG. 2, the thickness of each film unit varies between a maximum near the leading end, i.e., the end including container 44, a minimum intermediate its ends and an intermediate value near the trailing end. The leading end portion of the film unit is of maximum thickness because of container 44 and the trailing end portion is of an intermediate thickness due in part to the traps 45 provided therein to collect any surplus processing liquid. Accordingly, the end of container 12 having withdrawal opening 37 is of a greater thickness or depth than the opposite end of the container, i.e., the container is tapered toward wall 24.

Positioned between the film unit 42 located adjacent the light-transmitting section or exposure aperture 26 and forward wall 14 is a safety cover in the form of an opaque sheet of relatively rigid material 48 which is substantially coextensive with forward wall 14 and includes a plurality of apertures 46 for receiving means for moving the safety cover through slot 37 and an opaque flexible skirt 50 made from any suitable material, e.g., polyethylene, which is secured to the underside of sheet 48. Section 50 extends across withdrawal underside of sheet 48. Section 50 extends across withdrawal opening 37 and covers the apertures 46 to prevent the admission of light through said opening and apertures.

The means (not shown) for moving the safety cover or a film unit from the container 12 may comprise a reciprocating picklike member which enters the apertures 46 in the safety cover or the corresponding apertures in each film unit and moves the cover or film unit through opening 37. It may be possible for the picklike member to miss the aperture in the cover or film unit during one of its strokes and strike the cover or film unit thereby permanently depressing the corner of the cover or film unit toward the rear of the container to a position out of alignment with opening 37 wherein it could not deflect extension 38 sufficiently to enable it to pass through the opening 37 if extension 38 were located near the end of wall 22 closest to slot or aperture 28. The deflection of the film unit or cover is at a minimum near that side of the cover or film unit which is most remote from the picklike member. Accordingly, extension 38 is located near the end of wall 22 which is most remote from aperture 28.

Positioned between the wall 16 and the film unit located adjacent wall 16 is a support member in the form of a platenlike member 52 for supporting and urging the film units into position for exposure adjacent forward wall 14. Support member 52, which is formed from any suitable resilient material such as spring steel, includes a rectangularly shaped member, surrounding a generally H-shaped member comprised of an intermediate member 62 having first and second pairs of legs 64, 66 in the form of cantilever springs extending therefrom. Intermediate member 62 includes depressed portions near its ends for locating it in a plane spaced from a plane containing said rectangularly shaped member in order to insure that no portion of support member 52 comes into contact with a medial portion of a film unit.

From the foregoing it is apparent that there has been disclosed a novel, inexpensive and efficient photographic film assemblage including a one-piece, molded container having a withdrawal opening in one end thereof through which film units are adapted to be advanced and integral stop means for preventing the movement of more than one film unit at a time through the opening.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A photographic film assemblage comprising a container having a forward wall with a light-transmitting section therein and an end wall, said walls cooperating to define therebetween, an elongated opening dimensioned to permit the passage of a film unit therethrough and a plurality of film units arranged in stacked relation within said container behind said forward wall with one end of each of said film units located adjacent said end wall and said end of the forwardmost film unit aligned with said opening in position to move therethrough, the improvement comprising:

a stop member extending part way across said opening from said end wall to said forward wall for preventing movement of more than one of said film units at a time through said opening, said stop member comprising an integral portion of said end wall.

2. A photographic film assemblage as defined in claim 1 wherein said stop member is resilient.

3. A photographic film assemblage as defined in claim 1 wherein said container is of unitary construction.

4. A photographic film assemblage as defined in claim 1 wherein said forward wall includes an aperture therein located adjacent one side thereof intermediate said light-transmitting section and said opening for receiving means for engaging said forwardmost film unit and moving the latter through said opening, said stop means being located near the end of said opening most remote from said aperture.

5. A photographic film assemblage as defined in claim 1 wherein said stop member comprises an extended section of said end wall, extending across said opening toward forward wall, said end wall being formed with slits extending away from said opening adjacent each side of said extended section thereby increasing the effective length of said extended section.

6. A container for holding a plurality of photographic film units, said container comprising, in combination:

spaced forward and rear walls;

sidewalls and a first end wall formed integrally with said forward and rear walls to define a chamber for receiving a plurality of film units, said forward wall having a light-transmitting section therein for admitting light to said chamber to expose a film unit located therewithin behind said forward wall;

a second end wall initially formed adjacent an end edge of said rear wall as an extension thereof and in a plane substantially parallel with one of said forward and rear walls; and hinge means connecting said second end wall to said rear wall at said edge thereof, said hinge means comprising a narrow wall section integral with said second end wall and located at said edge of said rear wall, having a thickness less than the thickness of said second end wall and said rear wall for providing a high degree of flexibility to said narrow wall section;

said second end wall being folded at said section into a position wherein said second end wall is generally perpendicular to said forward wall and lies substantially in a plane containing said edge, said second end wall being secured to the ends of said sidewalls and cooperating with said forward wall to define an elongated opening dimensioned to permit the passage of a film unit therethrough.

7. A container as defined in claim 6 wherein said hinge means comprise a plurality of said wall sections of reduced thickness aligned with one another and separated by narrow, aligned openings.

8. A container as defined in claim 6 wherein said second end wall is formed with an integral projection extending beyond the edge of said second end wall part way across said elongated opening to provide means for preventing more than one film unit at a time from moving through said opening.